Sept. 19, 1950 V. G. JARMAN 2,522,949
SEALING FIXTURE
Filed Dec. 11, 1947
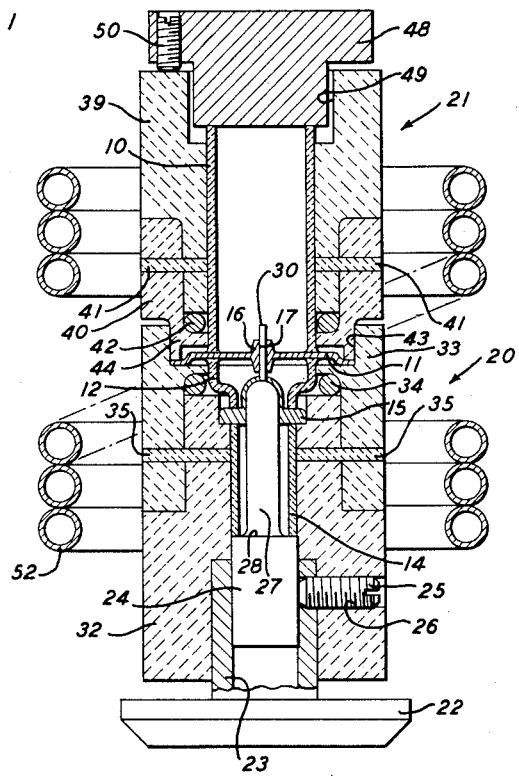
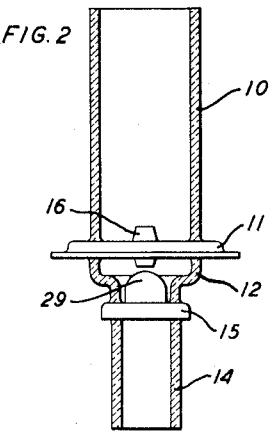
INVENTOR
V. G. JARMAN
BY
W. C. Parnell
ATTORNEY Patented Sept. 19, 1950

2,522,949

UNITED STATES PATENT OFFICE 2,522,949

SEALING FIXTURE

Vincent G. Jarman, Belleville, N. J., assignor to Western Electric Company, Incorporated, New York, N. Y., a corporation of New York Application December 11, 1947, Serial No. 791,103

5 Claims. (Cl. 49—1)

This invention relates to sealing apparatus and more particularly to apparatus for sealing metal and glass members together.

In the manufacture of certain electrical articles or devices, it is necessary to seal together hermetically in precisely predetermined relation to each other a plurality of metal members and glass members, the principal joints being metal to glass. The metal members in certain instances are extremely thin, and when the glass members must be heated by initially heating the metal members inductively to fuse the glass members thereto, the thin metal members are frequently damaged in creating heat therein of sufficient intensity and duration to fuse the glass members thereto.

An object of the invention is to provide an apparatus for sealing a glass member to a metal member by induction heating, the apparatus including heat radiating elements to assist the metallic member in fusing the glass members thereto.

With this and other objects in view, the invention comprises an apparatus for sealing a glass member to a metal member by induction heating, the apparatus including a unit to support the glass and metal members in predetermined positions relative to each other and to a high frequency element to inductively heat the metal member, and a heat radiating element disposed in the unit adjacent the portion of the glass member to be fused to the metal member to assist the metal member in fusing the glass member thereto.

In the present embodiment of the invention, tubular glass members are to be fused to opposite sides of a relatively thin copper disc. Interfitting units are composed mainly of ceramic materials, preferably Italian lava, formed to receive the tubular glass members and the copper disc to accurately position them with respect to each other. The units are also positioned with respect to a high frequency coil, either of which may be moved relative to the other to effect inductive heating of the copper disc. Metallic rings, defined as heat radiating rings, are mounted in each unit to be positioned closely adjacent the ends of the tubular glass members abutting the copper disc, whereby the tubular glass members may be heated more rapidly, than would be possible by inductively heating the copper disc alone, to efficiently fuse the glass members to the copper disc.

Other objects and advantages will be apparent from the following detailed description when considered in conjunction with the accompanying drawing wherein Fig. 1 is a vertical sectional view of the apparatus in closed position within a high frequency coil, and Fig. 2 is a vertical sectional view of the article completed through the aid of the sealing apparatus.

Referring now to the drawing, attention is first directed to Fig. 2 which illustrates a tubular glass member 10 which initially was cut to a given length for mounting on the top surface of a metal or copper disc 11. A tubular member 12, prior to reaching this assembling operation, was preformed and sealed with a tubular glass member 14 to a metallic member 15. The metallic member 11 has been shown in the drawing many times thicker than it is in actual structure, the central portion of the disc or member 11, including an embossed portion 16, having a central aperture 17 therein.

The sealing apparatus includes two main units 20 and 21. The unit 20 includes a support 22, which may be mounted in any suitable structure (not shown) having a vertically extending integral sleeve 23. A locating element 24 is mounted at any selected position within the sleeve 23 by the aid of a set screw 25 positioned in a threaded aperture 26 of the sleeve. The locating element includes a reduced portion 27, forming a shoulder 28 upon which the tubular glass member 14 rests. The upper end of the reduced portion 27 is rounded to extend into the dome-like portion 29 of the metal member 15, as illustrated in Fig. 1. A pin 30, carried by the upper end of the element 24, extends through an aperture in the dome-like portion 29 of the metal member 15 and through the aperture 17 of the metal member 11 to centrally locate the member 11 relative to the glass member 12 upon which it rests.

The unit 20 includes members 32 and 33, formed to fit one within the other, providing a cavity to receive a high electrical resistance metal ring 34, the ring being formed of suitable material, preferably stainless steel or Nichrome. The members 32 and 33 of the unit 20 are secured together by ceramic pins 35, positioned in aligned apertures in the members. The member 32 is centrally apertured not only to receive and be supported by the sleeve 23 of the support 22, but also receive a portion of the locating element 24 and the lower portion of the article including the members 12, 14, and 15.

The unit 21 is similar in detail to the unit 20, it also being formed of interfitting members 39 and 40 and secured together by ceramic pins 41, positioned in aligned apertures in the members. The members 39 and 40 are also formed to provide an annular cavity to receive a high electrical resistance metal ring 42, formed of suitable material, such as stainless steel or nichrome. The upper end of the unit 20 is recessed at 43 to receive the metal member or disc 11 as well as the reduced end 44 of the member 40 of the unit 21 to provide interfitting ends of the units to complete an oven closely surrounding and supporting the glass and metal members to be fused together. The members 39 and 40 of the unit 21 are centrally apertured to receive the tubular member 10, a metal member 48 formed to nest in a recess 49 in the upper end of the member 39 to rest upon the glass member 10, limited in its downward movement by adjustable screws 50, only one of which is shown, positioned in threaded apertures to engage the upper surface of the member 39. All of the members forming the oven, namely the members 32 and 33 of the unit 20 and the members 39 and 40 of unit 21, are produced from Italian lava in the circular cross-sectional contours shown and then heated slowly to 900° C. before assembly, to condition them for the purpose intended.

In preparing the apparatus to seal the glass members 10 and 12 to the metallic member 11 through induction heating by the aid of a high frequency coil 52, the units 20 and 21 are separated whereby the operator may first locate the member 12 with its attached members 14 and 15 within the unit 20 after which the metal member may be located in place, centered by the aid of the pin 30. At this time the metal member 11 will rest upon the glass member 12 but not upon the bottom of the recess 43, a given space being allowed for downward movement of the metal member during subsequent fusing of the glass member 12. The unit 21 is lowered in position, the glass member 10 moved downwardly through the central aperture of the unit 21, and the member 48 positioned in place to rest on the glass member 10. The apparatus may be mounted on a stationary base and the high frequency coil 52 lowered over the apparatus to the desired position centrally of the apparatus. Also, numerous apparatus of this type may be included in a single machine, preferably of the turret type, to be advanced intermittently from a loading station through heating and annealing stations, for more rapid production of the articles, as shown in Fig. 2. In the present embodiment of the invention, the high frequency coil is formed, as illustrated in Fig. 1, of spaced groups of convolutions positioned upon opposite sides of the metallic member 11 with the heat radiating rings 34 and 42 interposed between their respective portions of the high frequency coil and a member 11 to minimize the heat developed by the high frequency coil in the metal member 11 and to create maximum heat in the high resistance rings 34 and 42, whereby the glass members will be heated thereby sufficiently to fuse them to their respective surfaces of the metal member 11. The use of the lava members in the units 20 and 21 to completely surround glass members 10 and 12 completes an annealing oven to slowly cool the glass members after the sealing operation has been completed.

At the completion of one sealing operation, preferably after a given length of time necessary for the annealing of the glass members, the units 20 and 21 are separated, the completed article removed therefrom, and other glass and metal members inserted in place for a subsequent sealing operation.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. An apparatus for sealing glass members to opposing surfaces of a metal member comprising a coil having spaced groups of convolutions carrying high frequency current for inductively heating the metal member, relatively movable units to support the metal member substantially midway between the groups of convolutions of the coil and support the glass members in contact with the opposing surfaces of the metal member having annular recesses therein, and metallic elements of higher electrical resistance than the metal member supported in the annular recesses of their respective units between the metal member and their respective group of convolutions of the coil and in the fields thereof to be inductively heated thereby and to radiate their heat to the portions of the glass members contacting the metal member to seal the glass members to the metal member.

2. An apparatus for sealing a glass member to a metal member comprising a unit for supporting the members in contact with each other, a coil carrying high frequency current for inductively heating the metal member, and a metallic ring of higher electrical resistance than the metal member enclosed and supported by the unit closely adjacent the portion of the glass member to be fused and in the field of the coil to be inductively heated thereby and to radiate a large proportion of its heat to the said portion of the glass member to cause sealing of the members together, said high resistance ring being closed off from the said metallic member by said supporting unit.

3. An apparatus for sealing a glass member to a metal member comprising a coil carrying high frequency current for inductively heating the metal member, a metallic ring of higher electrical resistance than the metal member disposed closely adjacent the portion of the glass member to be fused and in the field of the coil to be inductively heated thereby and to radiate a large proportion of its heat to the said portion of the glass member to cause sealing of the members together, and a unit formed to closely surround and support the glass and metal members in contact with each other, to support and enclose the metallic ring in its given position closely adjacent the said portion of the glass member and to be heated by the metallic ring and to thereby retard cooling of the members to effect annealing of the glass member.

4. An apparatus for sealing a glass member to a metal member comprising a coil carrying high frequency current for inductively heating the metal member, a metallic ring of circular cross-section and of higher electrical resistance than the metal member surrounding the portion of the glass member to be fused and disposed closely adjacent thereto in the field of the coil to be inductively heated thereby and to radiate a large proportion of its heat to the said portion of the glass member to cause sealing of the members together, and a unit formed to closely surround and support the glass and metal members in contact with each other, to support and enclose the metallic ring in its given position adjacent the said portion of the glass member and to be heated by the metallic ring and to thereby retard cooling of the members to effect annealing of the glass member.

5. An apparatus for sealing a glass member to a metal member comprising a coil carrying high frequency current for inductively heating the metal member, a metallic ring of circular cross-section and of higher electrical resistance than the metal member disposed closely adjacent the portion of the glass member to be fused and in the field of the coil to be inductively heated thereby and to radiate its heat to the said portion of the glass member to cause sealing of the members together, and a unit formed mainly of a lavite material to closely surround and support the glass and metal members in contact with each other, to support and enclose the metallic ring concentric with the glass member and to be heated by the metallic ring and to thereby retard cooling of the members to effect annealing of the glass member.

VINCENT G. JARMAN.

REFERENCES CITED

The following references are of record in the file of this patent:

UNITED STATES PATENTS

| Number | Name | Date |
|---|---|---|
| 2,048,556 | McArthur | July 21, 1936 |
| 2,125,316 | Ronci | Aug. 2, 1938 |
| 2,386,820 | Spencer | Oct. 16, 1945 |